United States Patent
Fujise (10) Patent No.: US 10,362,189 B2
(45) Date of Patent: Jul. 23, 2019

(54) IMAGE READING APPARATUS HAVING AN ABNORMALITY DETECTING UNIT FOR A CALIBRATION PLATE

(71) Applicant: FUJI XEROX CO., LTD., Tokyo (JP)

(72) Inventor: Masaki Fujise, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/337,078

(22) Filed: Oct. 28, 2016

(65) Prior Publication Data
US 2017/0366693 A1    Dec. 21, 2017

(30) Foreign Application Priority Data

Jun. 17, 2016  (JP) ................................ 2016-121197

(51) Int. Cl.
| | | |
|---|---|---|
| H04N 1/047 | (2006.01) | |
| H04N 1/00 | (2006.01) | |
| H04N 1/04 | (2006.01) | |
| H04N 1/10 | (2006.01) | |

(52) U.S. Cl.
CPC ..... *H04N 1/00909* (2013.01); *H04N 1/00819* (2013.01); *H04N 1/0408* (2013.01); *H04N 1/1013* (2013.01); *H04N 2201/0081* (2013.01); *H04N 2201/044* (2013.01)

(58) Field of Classification Search
USPC ...... 358/1.1–3.29, 1.11–1.18, 504, 509, 474, 358/475; 355/43–67
See application file for complete search history.

(56) References Cited

U.S. PATENT DOCUMENTS

| | | | | |
|---|---|---|---|---|
| 5,943,141 | A | * | 8/1999 | Tamura ................ H04N 1/4076 358/461 |
| 2002/0003908 | A1 | | 1/2002 | Kijima et al. |
| 2002/0158192 | A1 | * | 10/2002 | Gann ..................... G01N 21/94 250/234 |
| 2003/0090742 | A1 | * | 5/2003 | Fukuda .................... H04N 1/04 358/448 |
| 2008/0292360 | A1 | * | 11/2008 | Hirai ........................ G01J 1/04 399/220 |

(Continued)

FOREIGN PATENT DOCUMENTS

| | | |
|---|---|---|
| JP | 2001-313793 A | 11/2001 |
| JP | 2004-135214 A | 4/2004 |
| JP | 2007-143040 A | 6/2007 |

*Primary Examiner* — Marcellus J Augustin
(74) *Attorney, Agent, or Firm* — Sughrue Mion, PLLC (57) ABSTRACT

An image reading apparatus includes a moving unit, a first detecting unit, and a second detecting unit. The moving unit moves a calibration plate in the main scanning direction relatively to a reading apparatus. The calibration plate is a plate for calibrating the reading apparatus. The reading apparatus has a reading unit and reading glass. The reading unit is arranged in the main scanning direction. The reading glass is disposed on a reading surface side of the reading unit. The first detecting unit detects an abnormality on the calibration plate from reading results. The reading results are obtained in such a manner that, while the moving unit is controlled to move the calibration plate, the reading unit reads the calibration plate. The second detecting unit detects an abnormality on the reading glass from the reading results.

17 Claims, 12 Drawing Sheets

(56) References Cited

U.S. PATENT DOCUMENTS

| | | | | |
|---|---|---|---|---|
| 2009/0033900 A1* | 2/2009 | Kanaya | ............... | G03F 7/70516 |
| | | | | 355/53 |
| 2011/0242628 A1* | 10/2011 | Morikawa | ................ | H04N 1/12 |
| | | | | 358/504 |
| 2013/0250377 A1* | 9/2013 | Kitai | ................. | H04N 1/00023 |
| | | | | 358/504 |
| 2013/0250378 A1* | 9/2013 | Kitai | ................. | H04N 1/00023 |
| | | | | 358/504 |
| 2014/0168725 A1* | 6/2014 | Yamamura | ......... | H04N 1/00005 |
| | | | | 358/475 |
| 2015/0256701 A1* | 9/2015 | Kimura | ............... | H04N 1/2034 |
| | | | | 358/474 |
| 2016/0094749 A1* | 3/2016 | Sahara | ............... | H04N 1/00909 |
| | | | | 358/474 |

\* cited by examiner

IMAGE READING APPARATUS HAVING AN ABNORMALITY DETECTING UNIT FOR A CALIBRATION PLATE

CROSS-REFERENCE TO RELATED APPLICATIONS

This application is based on and claims priority under 35 USC 119 from Japanese Patent Application No. 2016-121197 filed Jun. 17, 2016.

BACKGROUND

Technical Field

The present invention relates to an image reading apparatus, an image reading method, and a non-transitory computer readable medium.

SUMMARY

According to an aspect of the invention, there is provided an image reading apparatus including a moving unit, a first detecting unit, and a second detecting unit. The moving unit moves a calibration plate in a main scanning direction relatively to a reading apparatus. The calibration plate is a plate for calibrating the reading apparatus. The reading apparatus has a reading unit and reading glass. The reading unit is arranged in the main scanning direction. The reading glass is disposed on a reading surface side of the reading unit. The first detecting unit detects an abnormality on the calibration plate from reading results. The reading results are obtained in such a manner that, while the moving unit is controlled to move the calibration plate, the reading unit reads the calibration plate. The second detecting unit detects an abnormality on the reading glass from the reading results.

BRIEF DESCRIPTION OF THE DRAWINGS

Exemplary embodiment of the present invention will be described in detail based on the following figures, wherein.

DETAILED DESCRIPTION

Figure 1:
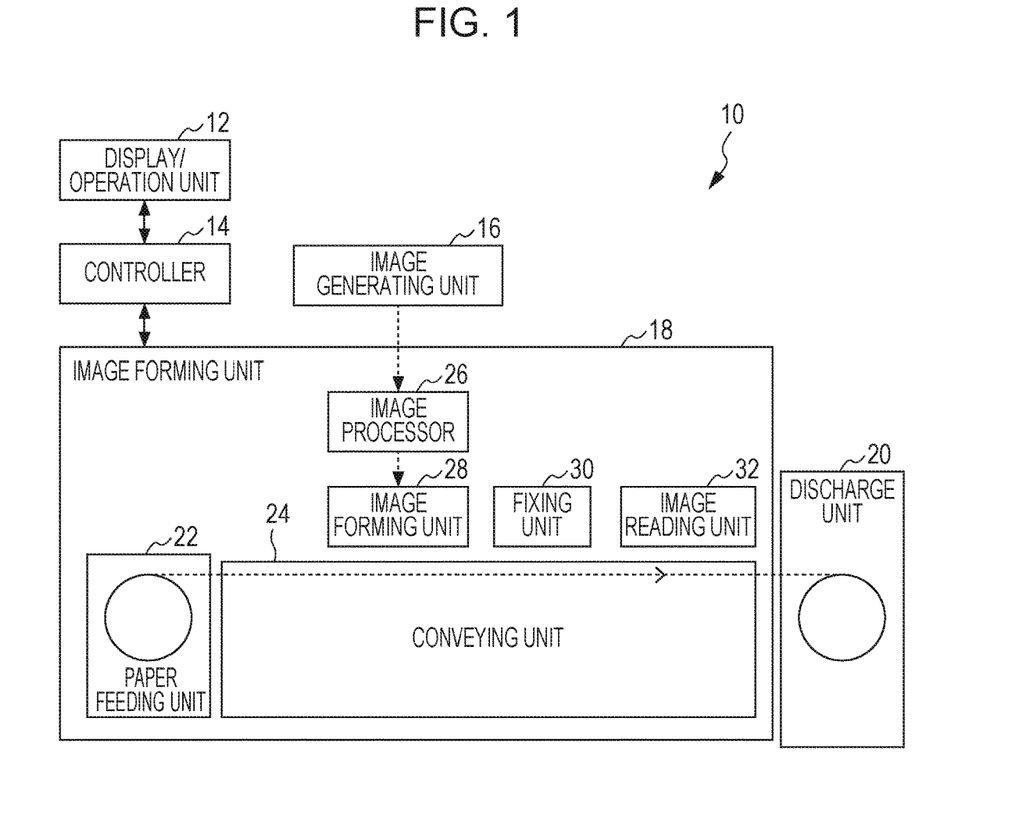
FIG. 1 is a diagram illustrating the schematic configuration of an image forming apparatus according to the present exemplary embodiment.

An exemplary embodiment will be described by referring to the drawings. FIG. 1 is a diagram illustrating the schematic configuration of an image forming apparatus according to the present exemplary embodiment.

An image forming apparatus 10 includes a display/operation unit 12, a controller 14, an image generating unit 16, an image forming unit 18, and a discharge unit 20.

The display/operation unit 12 includes a display unit such as a liquid crystal display and an operation unit for setting various settings for image formation. In the present exemplary embodiment, for example, the display/operation unit 12 is operated so that various settings, such as various conditions for image formation and a recording medium type with which an image is formed, are set.

The controller 14 has overall control of the units of the image forming apparatus 10, and controls the units of the image forming apparatus 10 according to information which is set by using the display/operation unit 12. The controller 14 is constituted, for example, by a microcomputer including a central processing unit (CPU), a read only memory (ROM), a random access memory (RAM), and an input/output unit. In the ROM, programs for controlling operations for image formation are stored in advance. The programs loaded on the RAM are executed by the CPU, whereby operations of the units of the image forming apparatus 10 are controlled.

The image generating unit 16 reads a document image, and thereby generates image information describing the document image. Alternatively, the image generating unit 16 obtains image information transmitted from an external computer, and thereby generates image information of a document image that is to be formed.

The image forming unit 18 includes a paper feeding unit 22, a conveying unit 24, an image processor 26, an image forming unit 28, a fixing unit 30, and an image reading unit 32.

The paper feeding unit 22 stores recording paper serving as a recording medium, and supplies the recording paper to the conveying unit 24. In the present exemplary embodiment, the paper feeding unit 22 stores recording paper wound into a roll. The recording paper is pulled out and supplied to the conveying unit 24. The paper feeding unit 22 may include multiple accommodating units for storing different sizes and types of paper. In this case, paper of the size and type which are set by using the display/operation unit 12 is supplied from a corresponding one of the accommodating units to the conveying unit 24. When image information is obtained from the outside, paper of the type specified from the outside is supplied from a corresponding one of the accommodating units to the conveying unit 24.

The conveying unit 24 conveys the recording paper supplied by the paper feeding unit 22 to the position at which the image is to be formed on the recording paper, and conveys, to the discharge unit 20, the recording paper on which the image has been formed.

The image processor 26 receives the image information which is generated by the image generating unit 16 or which is received by the image generating unit 16 from the outside, performs image processing so that the image is ready to be processed by the image forming unit 28, and outputs, to the image forming unit 28, the image information having been subjected to the image processing.

The image forming unit 28 receives the image information from the image processor 26, and forms, on the recording paper, an image represented by the image information. For example, the image forming unit 28 may employ an electrophotographic system in which an image is transferred onto the recording paper, or may employ an inkjet system or the like in which an image is formed on the recording paper by ejecting ink onto the recording paper.

The fixing unit 30 performs processing for fixing the image onto the recording paper. In the processing for fixing, at least one of pressuring and heating of the recording paper on which an image has been formed is performed, whereby the image is fixed onto the recording paper.

The image reading unit 32 reads the recording paper on which the image has been formed, and obtains image information for performing various types of correction (such as misregistration correction and color correction).

The discharge unit 20 winds, into a roll, the recording paper on which the image has been formed and stores the wound recording paper.

Figure 2:
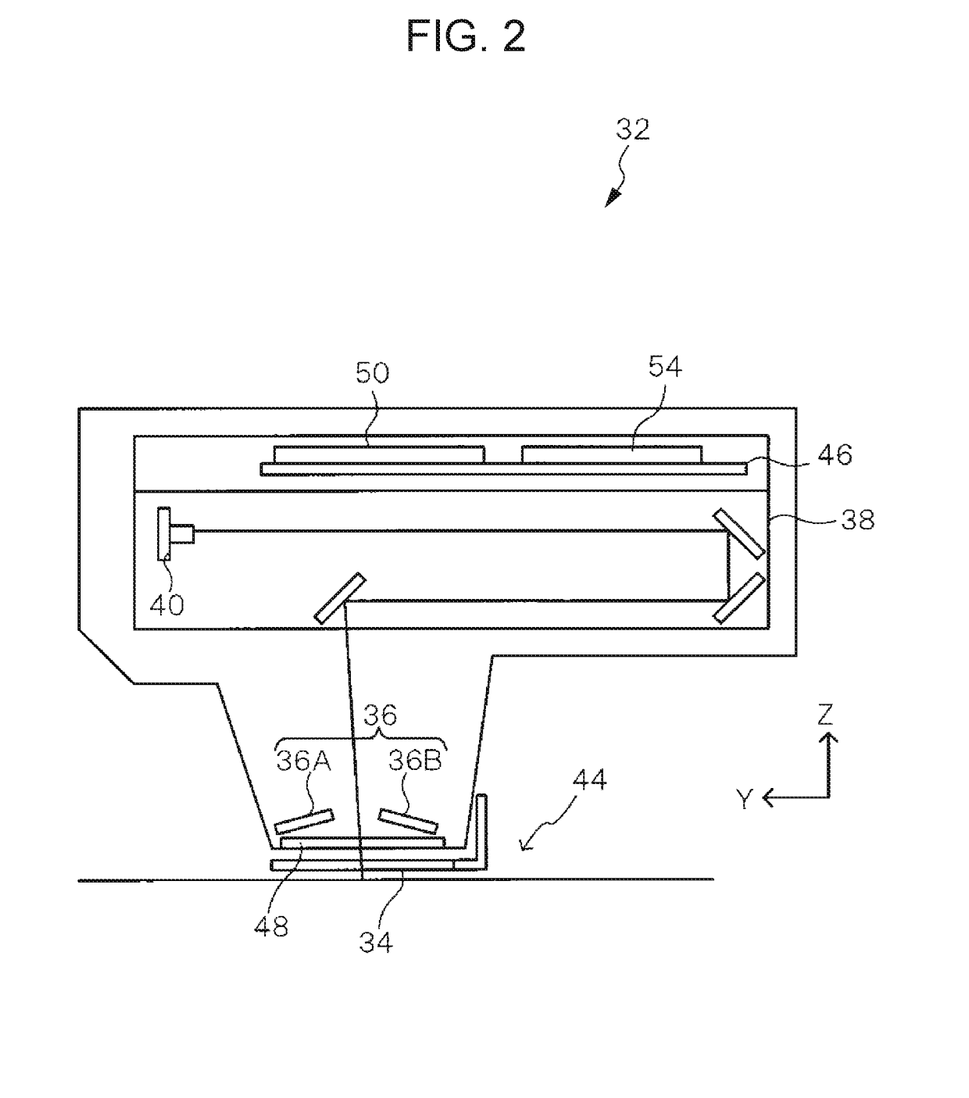
FIG. 2 is a diagram illustrating the schematic configuration of an image reading unit of the image forming apparatus according to the present exemplary embodiment.

The specific configuration of the image reading unit 32 will be described. FIG. 2 is a diagram illustrating the schematic configuration of the image reading unit 32 of the image forming apparatus 10 according to the present exemplary embodiment.

In the description below, the X direction indicates the depth direction (the main scanning direction) of the image forming apparatus 10; the Y direction indicates the lengthwise direction (the subscanning direction which is the conveying direction of the recording paper) of the image forming apparatus 10; and the Z direction indicates the height direction of the image forming apparatus 10.

As illustrated in FIG. 2, the image reading unit 32 includes a radiating unit 36 and an imaging unit 38. The radiating unit 36 is disposed above a conveyance path 44 for the recording paper. The radiating unit 36 which includes a pair of LED light sources 36A and 36B radiates light toward the recording paper on which an image has been formed. In each of the LED light sources 36A and 36B, multiple LEDs are disposed in the X direction. It is assumed that the length of the radiation area is larger than the width of the largest recording paper that is to be conveyed.

The imaging unit 38 includes an imaging optical system which converges light emitted from the radiating unit 36 and reflected from the recording paper on the CCD sensor 40 to form an image. For example, the imaging unit 38 which includes multiple mirrors for changing the optical axis in the Y and Z directions converges light emitted from the radiating unit 36 and reflected from the recording paper on the CCD sensor 40 to form an image. In the present exemplary embodiment, the case in which the CCD sensor 40 is a line sensor will be described as an example. Alternatively, an area sensor may be applied.

A control substrate 46 including a reading control device 50 and a control circuit 54 which are described below is disposed above the imaging unit 38.

The above-described configuration of the image reading unit 32 causes the CCD sensor 40 to output (feed back), to the controller 14 (see FIG. 1) of the image forming apparatus 10, light which has been converged to form an image, that is, a signal according to image density. The controller 14 corrects an image formed by the image forming unit 28, on the basis of the signal from the CCD sensor 40. For example, when an electrophotographic system is applied as the image forming unit 28, the image forming apparatus 10 corrects the intensity of irradiation light emitted by an exposure apparatus, the position at which an image is formed, and the like on the basis of the signal from the CCD sensor 40.

The image reading unit 32 is provided with a calibration plate 34 for performing calibration such as shading correction. The calibration plate 34 is, for example, a predetermined white reference board for which the color is white.

Figure 3:
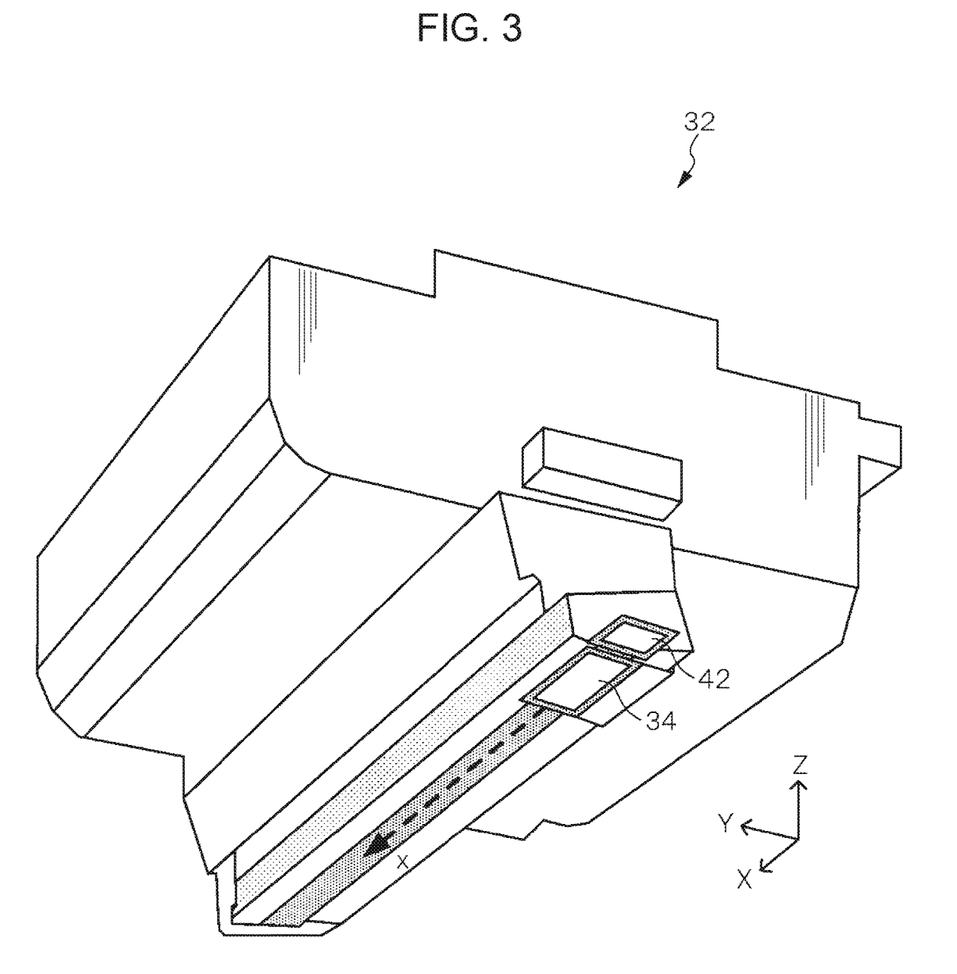
FIG. 3 is a perspective view of the appearance of the image reading unit of the image forming apparatus according to the present exemplary embodiment.

In the present exemplary embodiment, images are formed on continuous recording paper. Therefore, if the calibration plate 34 is provided in such a manner as to face the image reading unit 32, the recording paper needs to be ejected to read the calibration plate 34. Accordingly, as illustrated in FIG. 3, the calibration plate 34 is provided in such a manner as to be capable of being moved in the X direction (the direction indicated by an arrow x in FIG. 3) relatively to the image reading unit 32 by using a moving mechanism (not illustrated). When the calibration plate 34 is not being used, the calibration plate 34 is moved to a position which is not in a read range of the image reading unit 32. When the calibration plate 34 is to be used, the calibration plate 34 is moved into the read range of the image reading unit 32. The moving mechanism is driven by a calibration plate driving unit 56 (see FIG. 4) described below. In the present exemplary embodiment, an example in which the calibration plate 34 is moved will be described. Alternatively, the image reading unit 32 may be moved, or both may be moved. In the case where the image reading unit 32 is moved, other than the case in which the image reading unit 32 is moved, the imaging optical system in which imaging is performed on the CCD sensor 40 may be moved.

The image reading unit 32 is provided with a cleaning unit 42 for cleaning dirt from reading glass 48. When the cleaning unit 42 which is provided with a brush or the like cleans the reading glass 48, similarly to the calibration plate 34, the cleaning unit 42 is moved in the X direction, thereby cleaning the reading glass 48. The cleaning unit 42 is driven by a cleaning driving unit 58 (see FIG. 4) described below.

Figure 4:
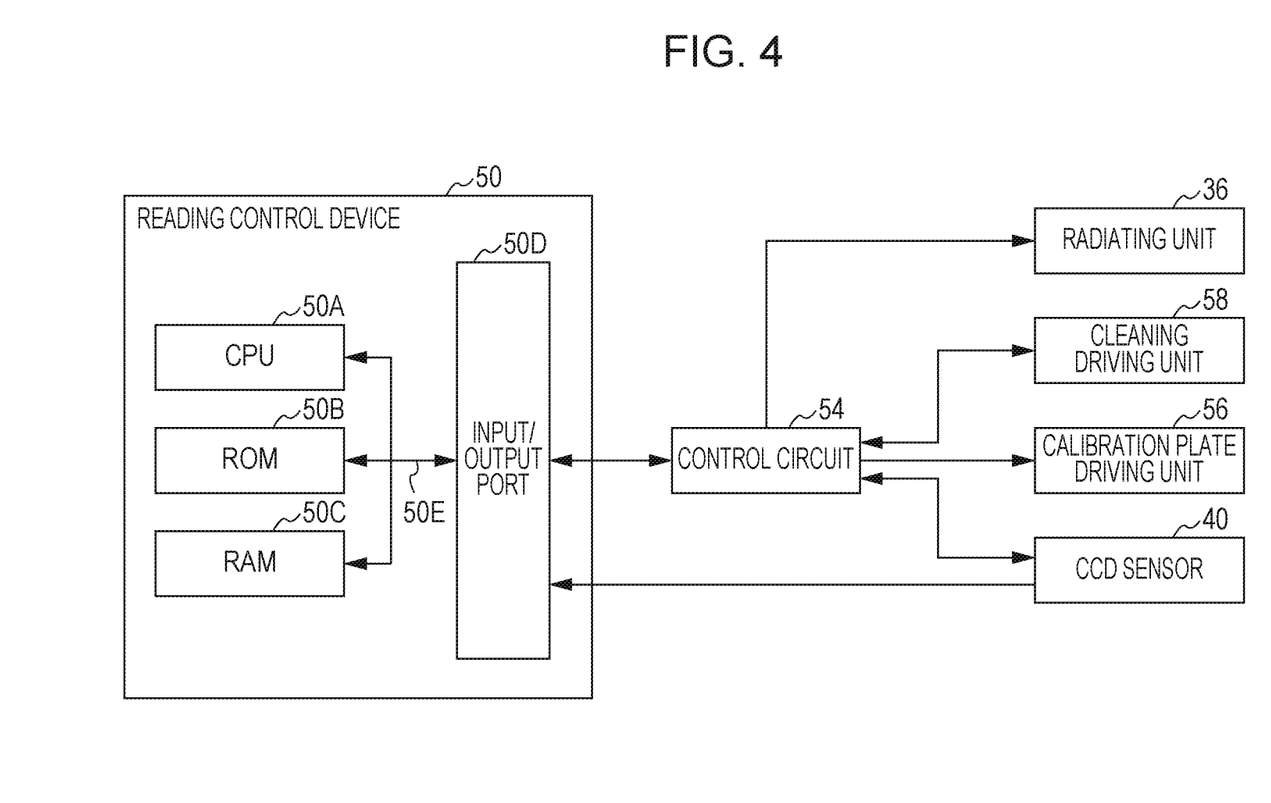
FIG. 4 is a block diagram illustrating the configuration of a control system of the image reading unit of the image forming apparatus according to the present exemplary embodiment.

FIG. 4 is a block diagram illustrating the configuration of a control system of the image reading unit 32 of the image forming apparatus 10 according to the present exemplary embodiment.

The image reading unit 32 is controlled by the reading control device 50. The reading control device 50 is provided with a function of controlling calibration of the image reading unit 32 (such as calibration of the CCD sensor 40 described above).

Specifically, as illustrated in FIG. 4, the reading control device 50 includes a CPU 50A, a ROM 50B, a RAM 50C, and an input/output port 50D which are connected to one another via buses 50E, such as an address bus, a data bus, and a control bus.

In the ROM 50B, various programs, such as programs for correcting an image and programs for performing various types of calibration of the image reading unit 32, are stored. The CPU 50A executes, on the RAM 50C, various programs stored in the ROM 50B, thereby exerting various types of control.

The input/output port 50D is connected to the control circuit 54. The control circuit 54 is connected to the radiating unit 36, the CCD sensor 40, the calibration plate driving unit 56 for moving the calibration plate 34, and the cleaning driving unit 58 which drives the cleaning unit 42. That is, the control circuit 54 is used to drive each of the radiating unit 36, the CCD sensor 40, the calibration plate driving unit 56, and the cleaning driving unit 58.

The reading control device 50 having such a configuration is provided with a function of correcting an image formed on the recording paper in such a manner that the CCD sensor 40 is used to read an image recorded on the recording paper and that the reading results are fed back to the controller 14. Examples of correction of an image include gradation correction, surface density correction, and sheet registration correction. Further, specifically, a predetermined correction pattern is formed for each type of correction on the recording paper, and the correction pattern is measured by using the image reading unit 32 so that various types of correction are performed.

In addition, the reading control device 50 performs various types of calibration of the image reading unit 32 (for example, calibration such as adjustment of the upper/lower limit value of output from the CCD sensor 40, shading correction, and correction of a readout value from the CCD sensor 40).

Calibration performed by the image reading unit 32 having such a configuration will be described. In the description below, a case in which shading correction is performed as an example of calibration will be described.

Figure 5A:
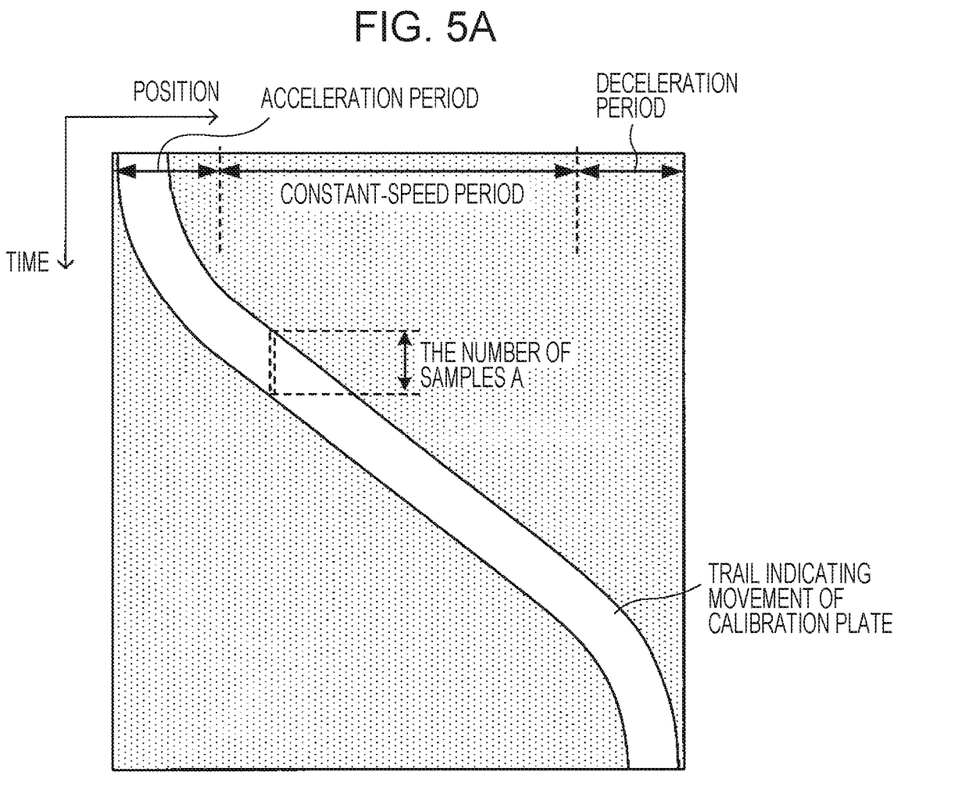
FIG. 5A is a diagram illustrating a trail which indicates how a calibration plate is moved in a lapse of time and which is obtained in the case where reading is performed while the calibration plate is moved.

When shading correction is to be performed, while the calibration plate 34 is being moved in the X direction, the CCD sensor 40 is used to read the calibration plate 34. In the present exemplary embodiment, an acceleration period, a constant-speed period, and a deceleration period are set in movement of the calibration plate 34. FIG. 5A illustrates a trail which indicates how the calibration plate 34 is moved in a lapse of time.

When shading correction is to be performed, while the calibration plate 34 is being moved, the calibration plate 34 is read by emitting light from the radiating unit 36 and by using the CCD sensor 40 which receives light reflected from the calibration plate 34. Based on the reading results, inconsistencies in brightness due to the characteristics of the optical system and the imaging system are corrected so that uniform brightness is obtained. Specifically, when reading is performed by using the CCD sensor 40 while the calibration plate 34 is being moved, as illustrated in FIG. 5A, multiple reading results (the number of samples A) are obtained at the same position (the same pixel) of the CCD sensor 40. Therefore, the average, the moving average, or the like is calculated, and a correction value for the reading results is calculated so that uniform brightness is obtained by using the calculation result.

Figure 5B:
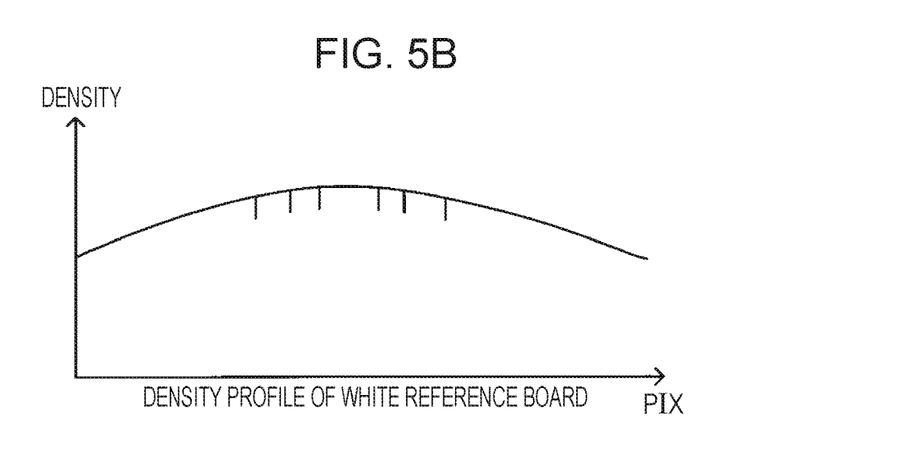
FIG. 5B is a diagram illustrating an exemplary density profile of a calibration plate (white reference board) which is obtained in the case where abnormalities, such as dust and dirt, occur.

When the calibration plate 34 is to be read, if abnormalities, such as dust or dirt, occur on the calibration plate 34 or the reading glass 48, as illustrated in FIG. 5B, density is reduced due to dust or dirt. Therefore, when calibration such as shading correction is to be performed, erroneous correction is performed on positions at which density is reduced, resulting in reduction in accuracy of calibration.

Therefore, in the present exemplary embodiment, an abnormality on the calibration plate 34 and an abnormality on the reading glass 48 are distinguished from each other and detected, and measures against each type of abnormality are taken.

Figure 6:
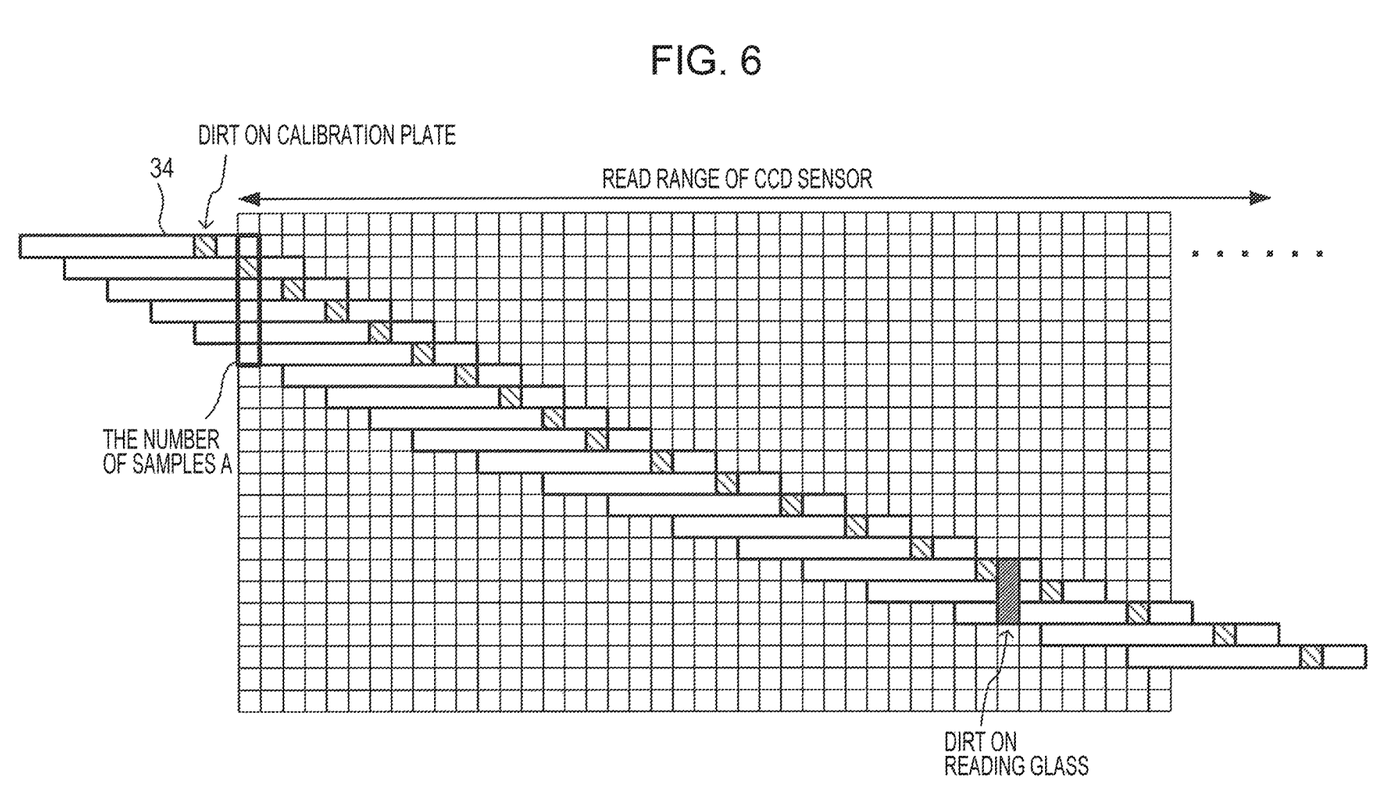
FIG. 6 is a diagram illustrating exemplary reading results from a charge coupled device (CCD) sensor which are obtained when an abnormality on the calibration plate and an abnormality on reading glass are present.

For example, when an abnormality occurs on the calibration plate 34 due to dust, dirt, or the like, comparison of multiple read images of the calibration plate 34 with one another reveals that, as illustrated in FIG. 6, density is reduced at the same position of the calibration plate 34 in each of the reading results from the CCD sensor 40. Therefore, in the present exemplary embodiment, when a density reduction which is equal to or larger than a predetermined value occurs at the same position of the calibration plate 34, it is determined that an abnormality occurs on the calibration plate 34, and the abnormal data is excluded from reference data for correction.

In contrast, when an abnormality occurs on the reading glass 48 due to dust, dirt, or the like, density abnormalities are present at the same position in the read range of the CCD sensor 40, and, as illustrated in FIG. 6, density abnormalities occur in all of the pixels in the Y direction (subscanning direction) in a calibration plate 34 portion in reading results. Therefore, in the present exemplary embodiment, when reductions in density occur at the same position in the read range of the CCD sensor 40, it is determined that an abnormality occurs on the reading glass 48.

Figure 7A:
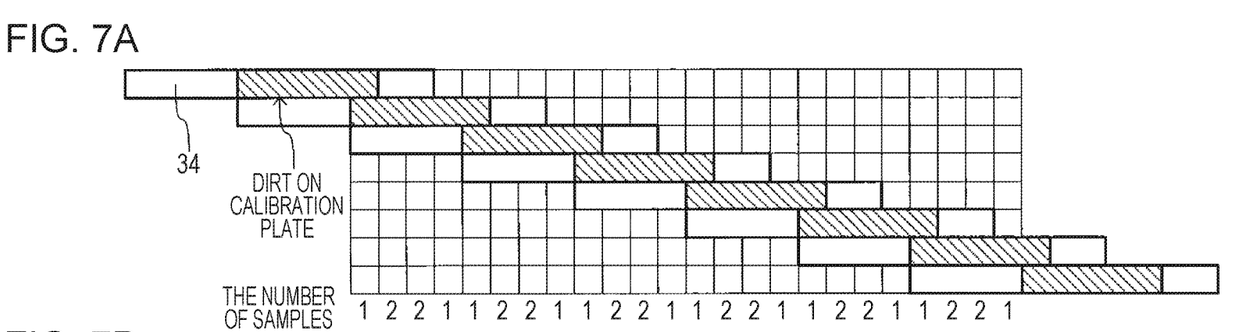
FIG. 7A is a diagram illustrating an example in which the number of samples of reading results from the CCD sensor is less than the required number because of abnormality.
Figure 7B:
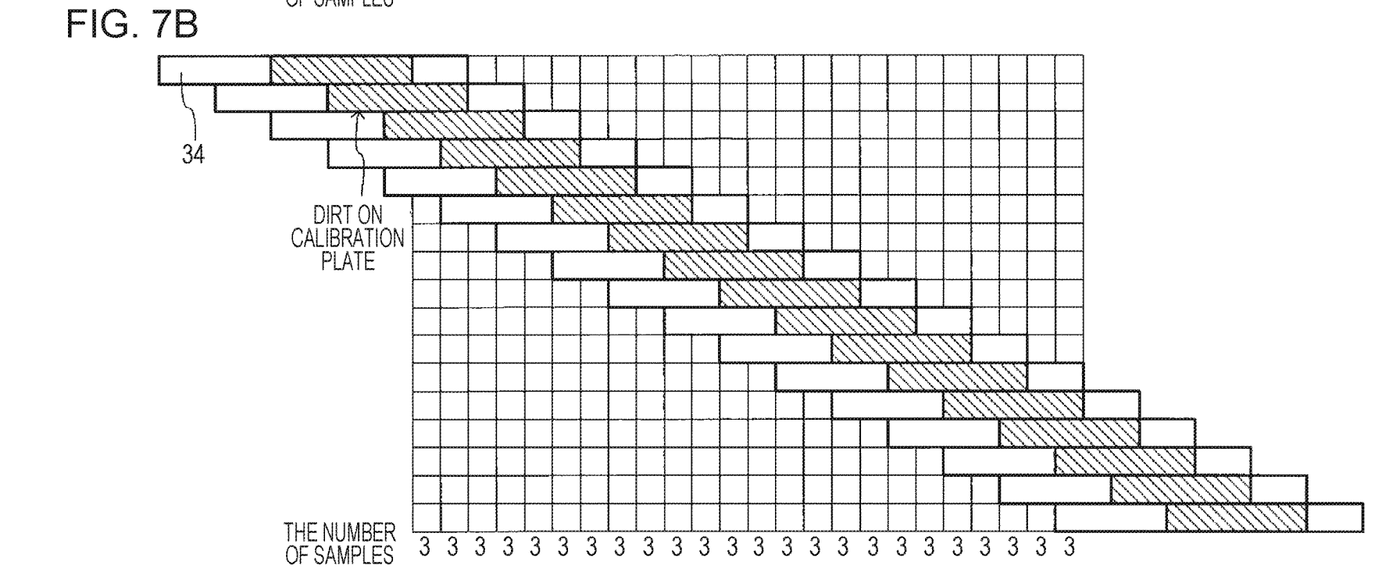
FIG. 7B is a diagram illustrating an example in which the number of samples is increased by decreasing the moving speed of the calibration plate.

When an abnormality is detected on the calibration plate 34, in the present exemplary embodiment, the moving speed of the calibration plate 34 is changed in accordance with the size of the abnormality on the calibration plate 34, whereby samples, the number of which is necessary to perform correction and which are other than abnormal samples in which density abnormalities occur due to the abnormality, are obtained. For example, as illustrated in FIG. 7A, when the number of samples is less than the required number due to the abnormality, the moving speed of the calibration plate 34 is decreased so that the number of samples is increased. In the case in FIG. 7A, when reading is performed while the calibration plate 34 is being moved, the numbers of samples other than abnormal samples are 1, 2, 2, 1, 1, . . . . At some positions, the number of samples is 1 because of the abnormality. Therefore, the moving speed of the calibration plate 34 is decreased, and reading is performed. By decreasing the moving speed of the calibration plate 34, as illustrated in FIG. 7B, the number of samples other than abnormal samples is 3 at all of the positions. Therefore, as an abnormality is larger, the moving speed of the calibration plate 34 is decreased, whereby the number of samples other than abnormal samples is increased. In the case where the abnormality on the calibration plate 34 is large and where it is necessary to substantially decrease the moving speed of the calibration plate 34, cleaning or change of the calibration plate 34 may be urged.

Figure 8A:
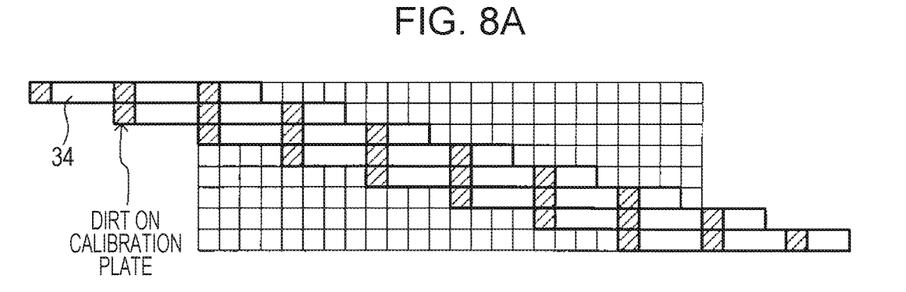
FIG. 8A is a diagram illustrating an example in which multiple abnormalities are present on the calibration plate and in which a reading period matches an interval at which an abnormality occurs.
Figure 8B:
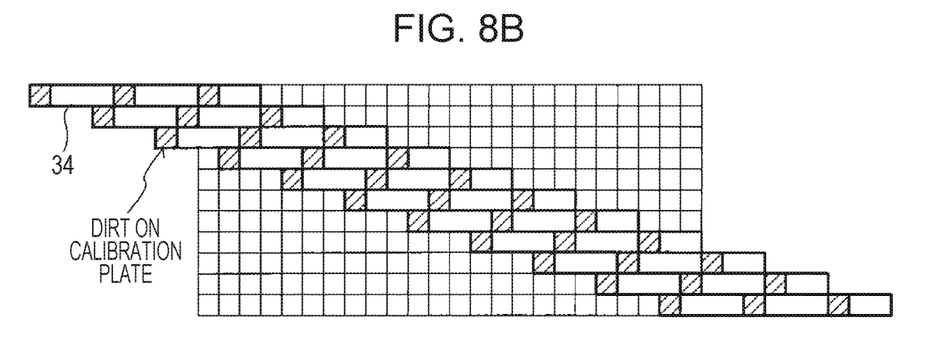
FIG. 8B is a diagram illustrating an example in which the moving speed of the calibration plate is decreased in the case of the example in FIG. 8A.
Figure 8C:
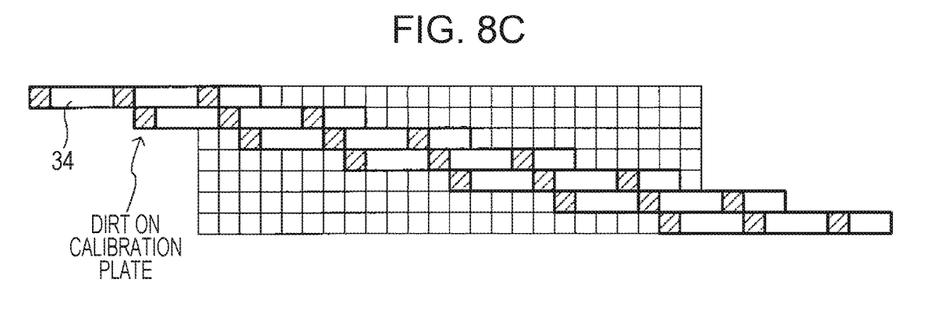
FIG. 8C is a diagram illustrating an example in which the moving speed of the calibration plate is increased in the case of the example in FIG. 8A.

When an abnormality occurs on the calibration plate 34 at multiple positions, as illustrated in FIG. 8A, the reading period matches an interval at which an abnormality occurs, and the number of samples other than abnormal samples is 0. In this case, similarly to the case of an abnormality on the reading glass 48, a density abnormality occurs at all of the pixels in the Y direction in a calibration plate 34 portion in the reading results. Since such a state occurs at multiple positions in the main scanning direction, it is determined that abnormalities occur on the calibration plate 34, and the moving speed of the calibration plate 34 is changed. FIG. 8B illustrates a case in which the moving speed of the calibration plate 34 is decreased, and the number of samples other than abnormal samples is increased. In this case, as illustrated in FIG. 8C, if the moving speed of the calibration plate 34 is increased, the number of samples other than abnormal samples is also increased. Therefore, the moving speed of the calibration plate 34 may be increased.

Figure 9:
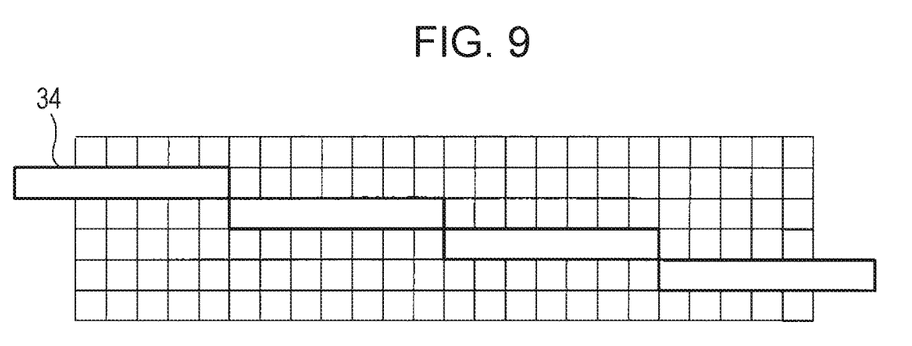
FIG. 9 is a diagram illustrating an example in which images of the calibration plate which are successively captured do not overlap each other in the X direction.

When reading is performed while the calibration plate 34 is being moved, in the case where images of the calibration plate 34 which are successively captured do not overlap each other in the X direction as illustrated in FIG. 9, it is impossible to perform these processes. Therefore, in the present exemplary embodiment, the relationship among the moving speed of the calibration plate 34, the size of the calibration plate 34 (the width in the X direction), and an interval at which the CCD sensor 40 performs reading is such that captured images of the calibration plate 34 overlap each other in the X direction.

In contrast, when an abnormality is detected on the reading glass 48, the cleaning unit 42 is driven to clean the reading glass 48, and the calibration plate 34 is then read again.

Figure 10:
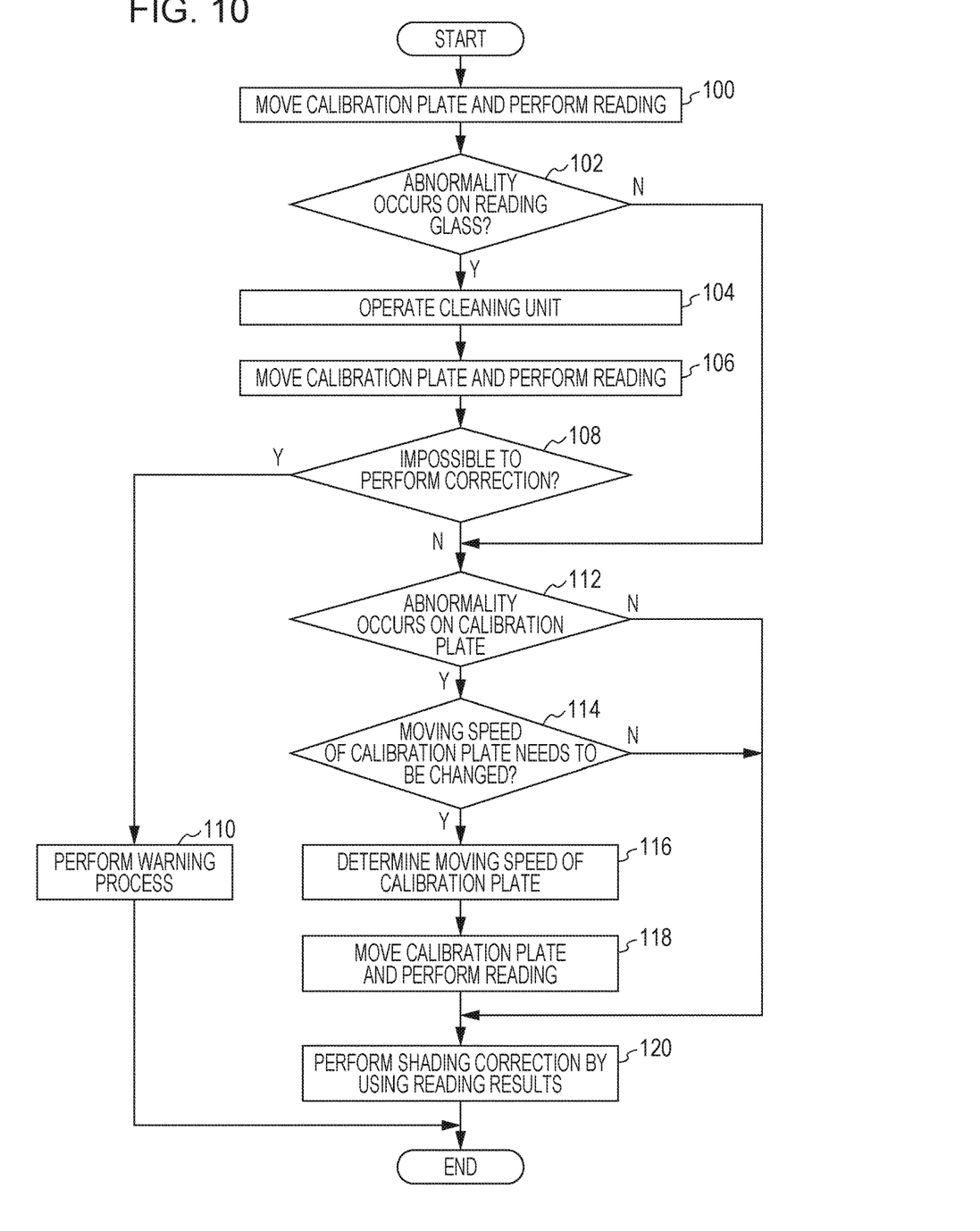
FIG. 10 is a flowchart of an exemplary process flow performed by a reading control device of the image forming apparatus according to the present exemplary embodiment.

A specific process performed by the reading control device 50 when the image reading unit 32 having the above-described configuration is calibrated will be described. FIG. 10 is a flowchart of an exemplary process flow performed by the reading control device 50 of the image forming apparatus 10 according to the present exemplary embodiment. The process illustrated in FIG. 10 will be described as a process performed when shading correction is performed on the image reading unit 32.

In step 100, the CPU 50A controls driving of each of the calibration plate driving unit 56 and the CCD sensor 40 via the control circuit 54 so that the calibration plate 34 is moved and read. Then, the process proceeds to step 102.

In step 102, the CPU 50A determines whether or not an abnormality occurs on the reading glass 48 on the basis of reading results obtained by reading the calibration plate 34. In the determination, it is determined whether or not the following conditions are satisfied: a density abnormality occurs at the same position in the read range of the CCD sensor 40; and, as illustrated in FIG. 6, a density abnormality occurs at all of the pixels in the Y direction (subscanning direction) in a calibration plate 34 portion in the reading results. If the determination result is positive, the process proceeds to step 104. If the determination result is negative, the process proceeds to step 112.

In step 104, the CPU 50A drives the cleaning driving unit 58 via the control circuit 54 to operate the cleaning unit 42, and the process proceeds to step 106. Thus, the cleaning unit 42 removes the abnormality, such as dust or dirt, on the reading glass 48.

In step 106, the CPU 50A controls driving of the calibration plate driving unit 56 and the CCD sensor 40 via the control circuit 54 so that the calibration plate 34 is moved and read again. Then, the process proceeds to step 108.

In step 108, for example, the CPU 50A determines whether or not the area of the abnormal portion on the reading glass 48 is still equal to or greater than a predetermined reference value even after cleaning, thereby determining whether or not it is impossible to perform correction. If the determination result is positive, the process proceeds to step 110. If the determination result is negative, the process proceeds to step 112.

In step 110, the CPU 50A performs a warning process and ends the series of processes. For example, the CPU 50A notifies the controller 14 that the reading glass 48 is to be changed, whereby the controller 14 outputs a warning by displaying a message or the like describing that the reading glass 48 is to be changed, on the display/operation unit 12.

In step 112, the CPU 50A determines whether or not an abnormality occurs on the calibration plate 34 on the basis of the reading results obtained by reading the calibration plate 34. In the determination, multiple read images of the calibration plate 34 are compared with one another, and, for example, as illustrated in FIG. 6, it is determined whether or not density reduction occurs at the same position of the calibration plate 34 in each of the read images. If the determination result is positive, the process proceeds to step 114. If the determination result is negative, the process proceeds to step 120.

In step 114, the CPU 50A determines whether or not the moving speed of the calibration plate 34 needs to be changed. In the determination, for example, it is determined whether or not the number of samples which are other than abnormal samples and which are arranged in the Y direction is equal to or less than a predetermined number due to an abnormality on the calibration plate 34. If the determination result is positive, the process proceeds to step 116. If the determination result is negative, the process proceeds to step 120.

In step 116, the CPU 50A determines the moving speed of the calibration plate 34, and the process proceeds to step 118. The moving speed of the calibration plate 34 is determined on the basis of the reading results obtained in step 100 so that a speed that causes the number of samples which are other than abnormal samples and which are arranged in the Y direction to be increased is determined. If a large-sized abnormality on the calibration plate 34 makes it impossible to determine a speed that causes the number of samples which are other than abnormal samples and which are arranged in the Y direction to be increased, the process may proceed to step 110 to perform a warning process.

In step 120, the CPU 50A uses the reading results from the CCD sensor 40 to perform shading correction, and ends the series of processes.

In the above-described exemplary embodiment, when an abnormality is detected on the calibration plate 34, the moving speed of the calibration plate 34 is changed, and the calibration plate 34 is read. However, the method for addressing an abnormality on the calibration plate 34 is not limited to this.

Figure 11:
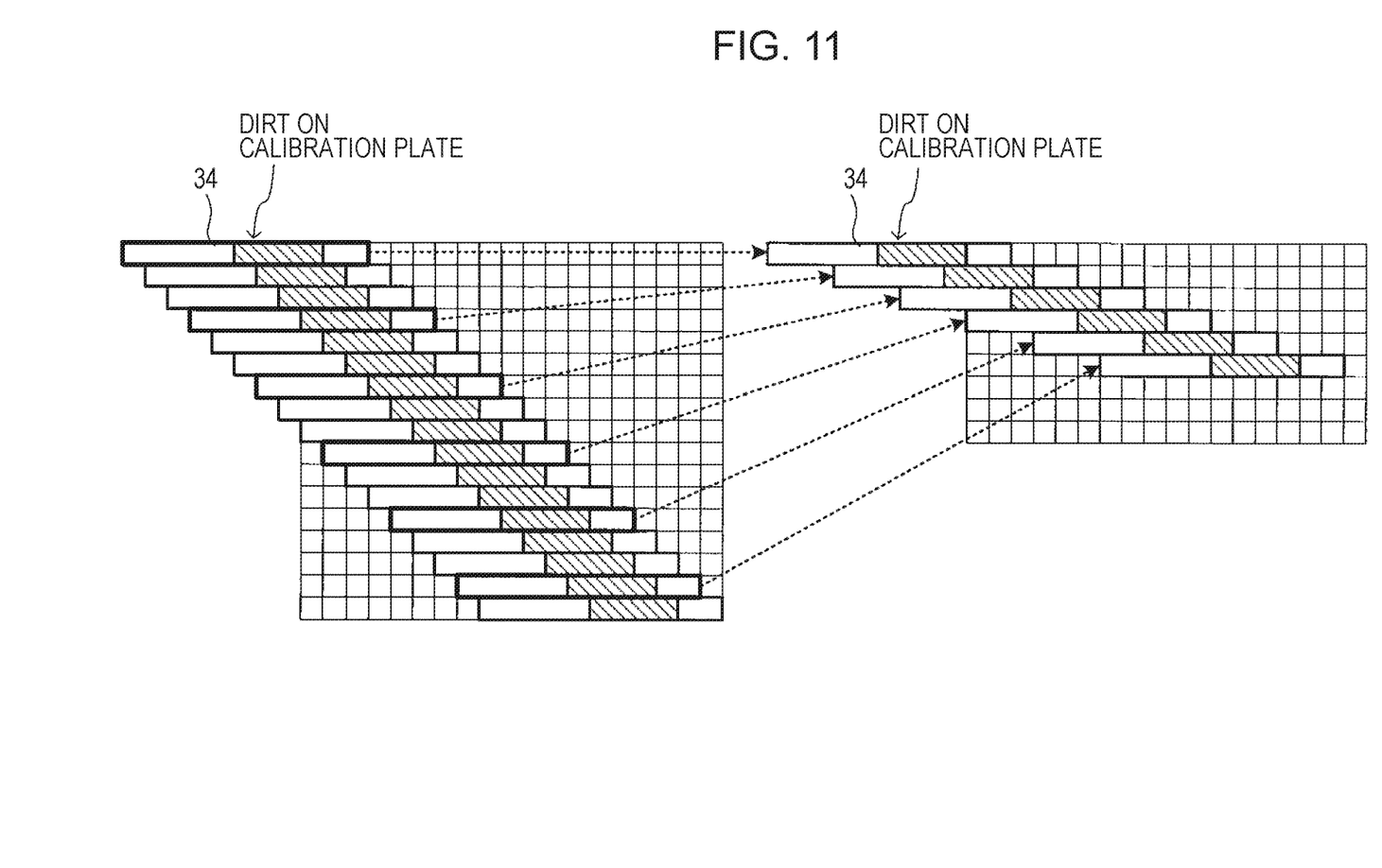
FIG. 11 is a diagram illustrating an example in which pieces of data obtained by reading the calibration plate at the maximum resolution are regularly thinned out.
Figure 12:
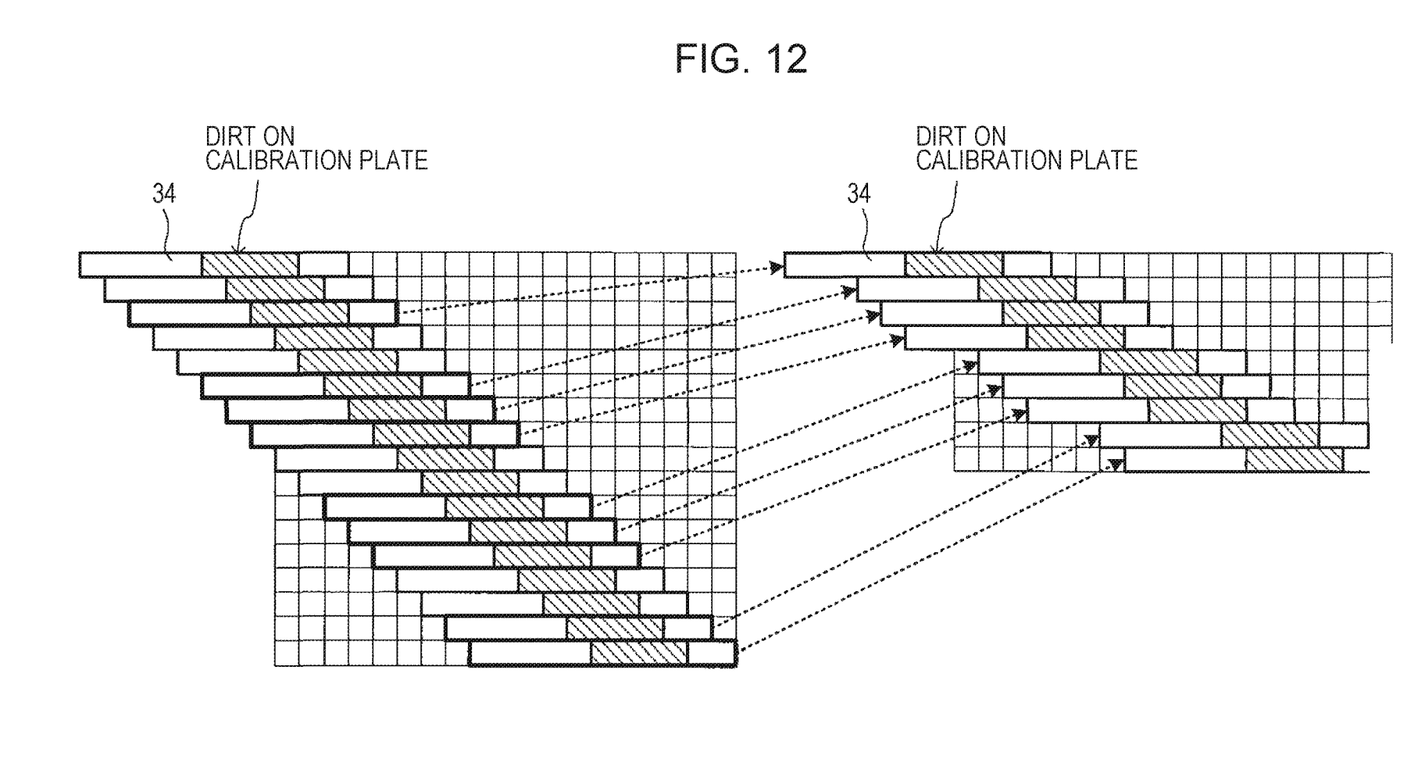
FIG. 12 is a diagram illustrating an example in which pieces of data obtained by reading the calibration plate at the maximum resolution are irregularly thinned out.

For example, instead of change of the moving speed of the calibration plate 34, the sampling period used when the CCD sensor 40 reads the calibration plate 34 may be changed. Specifically, compare the case in which reading is performed at the maximum resolution (left diagram in FIG. 11) with the case in which thinning is regularly performed (at certain intervals) on data obtained at the maximum resolution (right diagram in FIG. 11). It shows that reading results similar to those obtained when the moving speed of the calibration plate 34 is changed are obtained. That is, by changing the number of samples obtained by thinning out data obtained at the maximum resolution, reading results similar to those obtained when the moving speed of the calibration plate 34 is changed are obtained. When the sampling period for the CCD sensor 40 is changed, as illustrated in FIG. 12, thinning may be irregularly performed (not at certain intervals) on data obtained at the maximum resolution. Irregular thinning is performed so that a large number of samples in a portion in which an abnormality occurs on the calibration plate 34 are obtained and so that a larger number of pieces of data in a portion in which an abnormality does not occur are removed, achieving use of less memory capacity. Alternatively, regular thinning and irregular thinning may be used for different cases. For example, irregular thinning may be applied when the memory capacity is equal to or less than a predetermined capacity, and regular thinning may be applied when the memory capacity is larger than the predetermined capacity.

Another example of a method for addressing an abnormality on the calibration plate 34 may be a method in which both of the moving speed of the calibration plate 34 and the sampling period are changed.

In the above-described exemplary embodiment, the case in which the calibration plate 34 is capable of being moved in the X direction (main scanning direction) is described. Alternatively, the calibration plate 34 may be moved in the Y direction (subscanning direction). In this case, when an abnormality occurs on the calibration plate 34, the calibration plate 34 may be shifted in the subscanning direction to read a surface on which a smaller-sized abnormality occurs.

In the above-described exemplary embodiment, shading correction is described as an example of calibration of the image reading unit 32. However, this is not limiting. For example, other calibration, such as adjustment of the amount of light from the radiating unit 36, and gain adjustment for the CCD sensor 40, may be applied.

Programs describing the process performed by the reading control device 50 of the image forming apparatus 10 according to the above-described exemplary embodiment may be stored in a storage medium and may be distributed.

The present invention is not limited to the description above. Needless to say, other than the description above, various changes may be made without departing from the gist of the present invention.

What is claimed is:

1. An image reading apparatus comprising:
   a moving unit configured to move a calibration plate in a main scanning direction relatively to a reading apparatus of the image reading apparatus, the calibration plate being a plate for calibrating the reading apparatus, the reading apparatus having a reading unit and reading glass, the reading unit being arranged in the main scanning direction, the reading glass being disposed on a reading surface side of the reading unit; and
   at least one processor configured to act as:
      a first detecting unit configured to detect an abnormality on the calibration plate from reading results, the reading results being obtained in such a manner that, while the moving unit is controlled to move the calibration plate, the reading unit reads the calibration plate;
      a second detecting unit configured to detect an abnormality on the reading glass from the reading results and
      a calibration unit configured to, when the first detecting unit detects the abnormality on the calibration plate, perform a predetermined calibration by using the reading results, the reading results being obtained in such a manner that a speed at which the calibration plate is moved is changed and that, while the calibration plate is moved, the reading unit reads the calibration plate.

2. The image reading apparatus according to claim 1,
   wherein the first detecting unit detects, as occurrence of the abnormality on the calibration plate, a case in which a density abnormality occurs at an identical position of the calibration plate in each of the reading results, the reading results being obtained by reading the calibration plate multiple times.

3. The image reading apparatus according to claim 2,
   wherein the second detecting unit detects, as occurrence of the abnormality on the reading glass, a case in which a density abnormality occurs at an identical position of a read range of the reading apparatus in each of the reading results, the reading results being obtained by reading the calibration plate multiple times.

4. The image reading apparatus according to claim 3, further comprising:
   a cleaning unit configured to clean the reading glass,
      wherein the at least one processor is further configured to drive the cleaning unit when the second detecting unit detects the abnormality on the reading glass.

5. The image reading apparatus according to claim 2, further comprising:
   a cleaning unit configured to clean the reading glass,
      wherein the at least one processor is further configured to drive the cleaning unit when the second detecting unit detects the abnormality on the reading glass.

6. The image reading apparatus according to claim 1,
   wherein the second detecting unit detects, as occurrence of the abnormality on the reading glass, a case in which a density abnormality occurs at an identical position of a read range of the reading apparatus in each of the reading results, the reading results being obtained by reading the calibration plate multiple times.

7. The image reading apparatus according to claim 6, further comprising:
   a cleaning unit configured to clean the reading glass,
      wherein the at least one processor is further configured to drive the cleaning unit when the second detecting unit detects the abnormality on the reading glass.

8. The image reading apparatus according to claim 1,
   wherein the speed at which the calibration plate is moved is changed to a slower speed.

9. The image reading apparatus according to claim 8, further comprising:
   a cleaning unit configured to clean the reading glass,
      wherein the at least one processor is further configured to drive the cleaning unit when the second detecting unit detects the abnormality on the reading glass.

10. The image reading apparatus according to claim 1, further comprising:
    a cleaning unit configured to clean the reading glass,
       wherein the at least one processor is further configured to drive the cleaning unit when the second detecting unit detects the abnormality on the reading glass.

11. The image reading apparatus according to claim 1, further comprising:
    a cleaning unit configured to clean the reading glass,
       wherein the at least one processor is further configured to drive the cleaning unit when the second detecting unit detects the abnormality on the reading glass.

12. A non-transitory computer readable medium storing a program causing a computer to function as the units included in the image reading apparatus according to claim 1.

13. An image reading apparatus comprising:
a moving unit configured to move a calibration plate in a main scanning direction relatively to a reading apparatus of the image reading apparatus, the calibration plate being a plate for calibrating the reading apparatus, the reading apparatus having a reading unit and reading glass, the reading unit being arranged in the main scanning direction, the reading glass being disposed on a reading surface side of the reading unit, and at least one processor configured to act as:
   a first detecting unit configured to detect an abnormality on the calibration plate from reading results, the reading results being obtained in such a manner that, while the moving unit is controlled to move the calibration plate, the reading unit reads the calibration plate; and
   a second detecting unit configured to detect an abnormality on the reading glass from the reading results, wherein the at least one processor is further configured to act as:
   a calibration unit configured to, when the first detecting unit detects the abnormality on the calibration plate, perform a predetermined calibration by using the reading results, the reading results being obtained in such a manner that a sampling period of the reading unit is changed and that, while the calibration plate is moved, the reading unit reads the calibration plate.

14. The image reading apparatus according to claim 13, wherein the sampling period of the reading unit is changed to a shorter sampling period.

15. The image reading apparatus according to claim 14, further comprising:
a cleaning unit configured to clean the reading glass,
wherein the at least one processor is further configured to drive the cleaning unit when the second detecting unit detects the abnormality on the reading glass.

16. The image reading apparatus according to claim 13, further comprising:
a cleaning unit configured to clean the reading glass,
wherein the at least one processor is further configured to drive the cleaning unit when the second detecting unit detects the abnormality on the reading glass.

17. An image reading method comprising:
moving a calibration plate in a main scanning direction relatively to a reading apparatus, the calibration plate being a plate for calibrating the reading apparatus, the reading apparatus having a reading unit and reading glass, the reading unit being arranged in the main scanning direction, the reading glass being disposed on a reading surface side of the reading unit;
detecting an abnormality on the calibration plate from reading results, the reading results being obtained in such a manner that, while the calibration plate is moved, the reading unit reads the calibration plate; and
detecting an abnormality on the reading glass from the reading results,
wherein when the abnormality is detected on the calibration plate, performing a predetermined calibration by using the reading results, the reading results being obtained in such a manner that a sampling period of the reading unit is changed, or a speed at which the calibration plate is moved is changed and that, while the calibration plate is moved, the reading unit reads the calibration plate.

* * * * *